United States Patent [19]

Arman

[11] 4,063,328
[45] Dec. 20, 1977

[54] LAMINATE SUPPORT FOR WINDSHIELD WIPER BLADES

[76] Inventor: Dario Arman, Via Veneria, 13./15, Druento (Turin), Italy, 10040

[21] Appl. No.: 675,866

[22] Filed: Apr. 12, 1976

[30] Foreign Application Priority Data

Apr. 11, 1975 Italy .................................. 67940/75

[51] Int. Cl.² .............................................. B60S 1/04
[52] U.S. Cl. .................................................. 15/250.42
[58] Field of Search ......................... 15/250.32, 250.42

[56] References Cited

U.S. PATENT DOCUMENTS

| 2,543,383 | 2/1951 | Scinta et al. | 15/250.42 |
| 3,048,872 | 8/1962 | Kerrigan | 15/250.36 |
| 3,093,856 | 6/1963 | Smithers | 15/250.42 |
| 3,192,551 | 7/1965 | Appel | 15/250.36 |
| 3,208,091 | 9/1965 | Golub et al. | 15/250.36 |
| 3,717,900 | 2/1973 | Quinlan et al. | 15/250.36 |
| 3,872,537 | 3/1975 | Bianchi | 15/250.36 |

*Primary Examiner*—Peter Feldman
*Attorney, Agent, or Firm*—Browdy and Neimark

[57] ABSTRACT

A laminate support for windshield wiper blades comprising a curved laminate element which is elastically deformable in the longitudinal direction and being provided with a longitudinal slit for retaining a longitudinal rib of the wiper blade and parallel ears for attachment to an oscillable arm.

1 Claim, 7 Drawing Figures

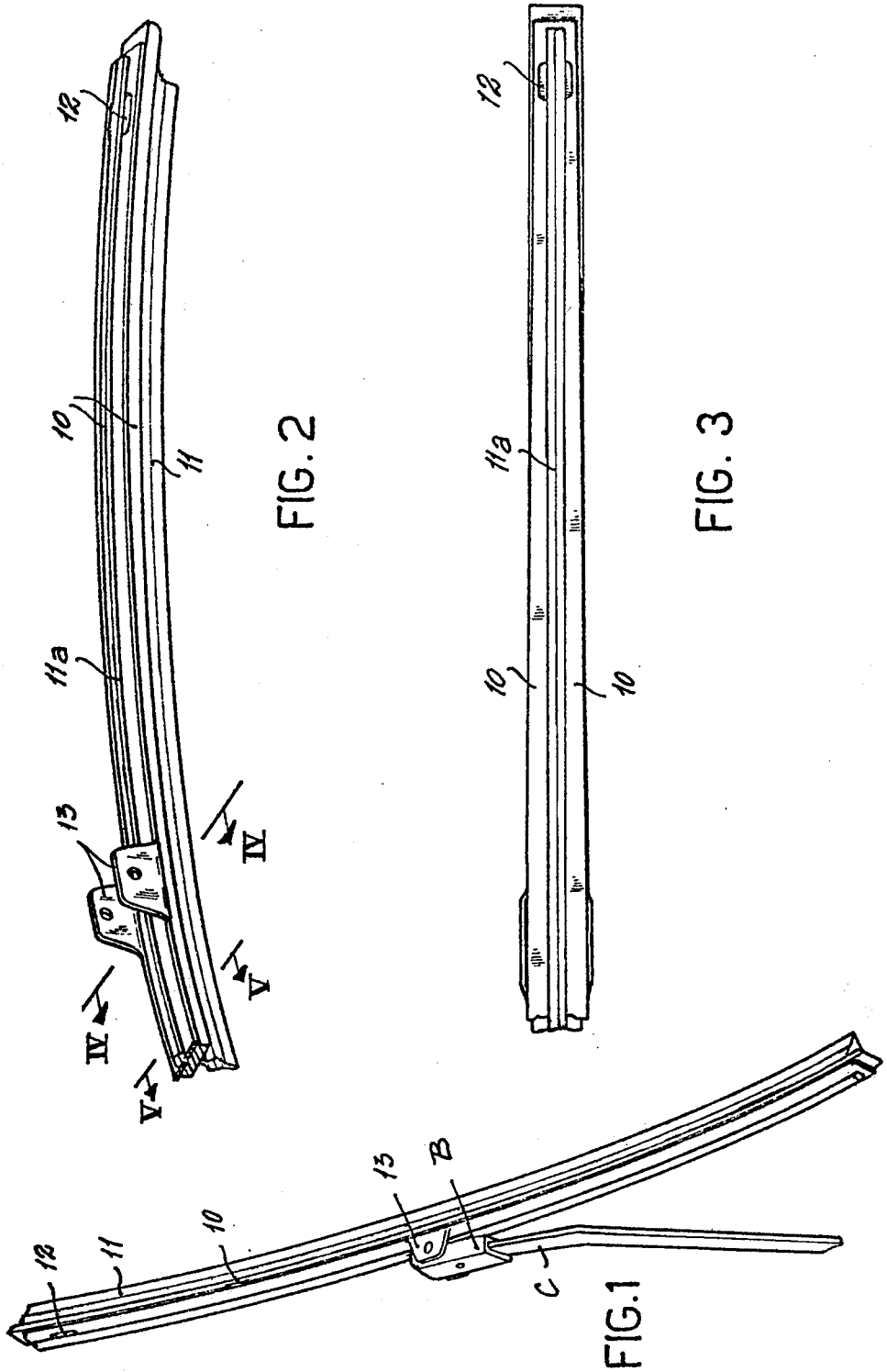

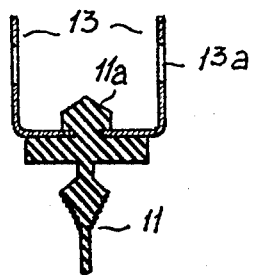
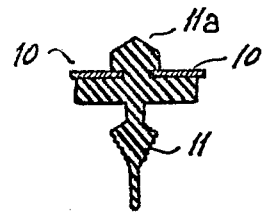
FIG. 4  FIG. 5
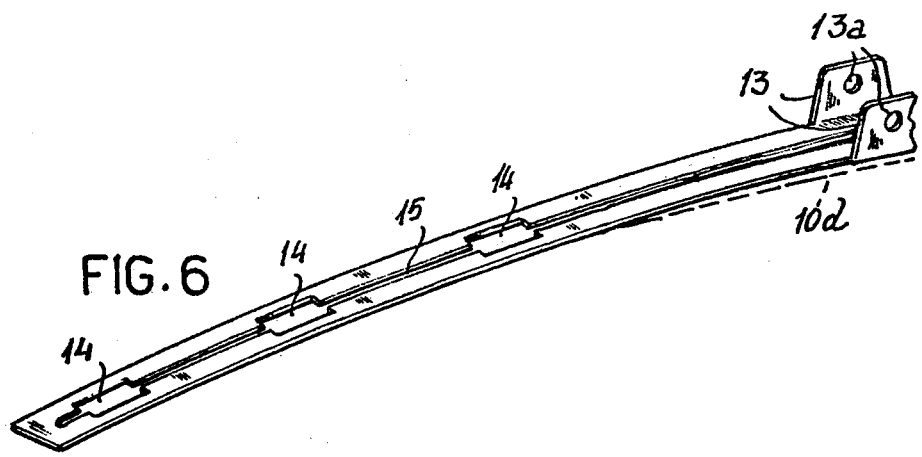
FIG. 6
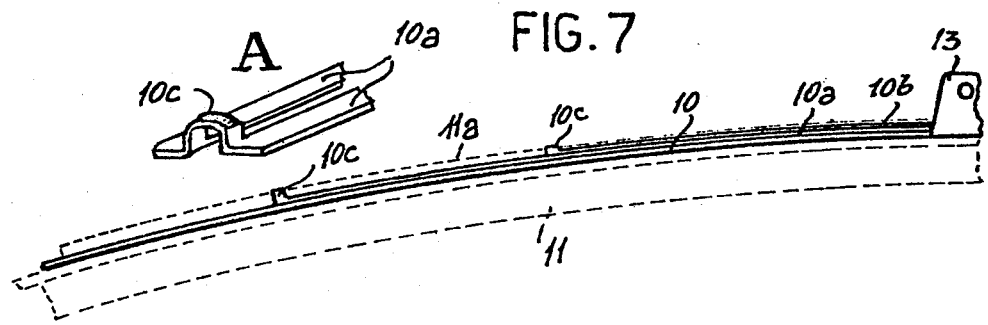
FIG. 7

LAMINATE SUPPORT FOR WINDSHIELD WIPER BLADES

FIELD OF THE INVENTION

The wiper blades in the windshield wiper installations on motor vehicles in general, comprise a blade usually made of rubber and a support for the same. The present invention relates to such wiper blade supports.

BACKGROUND OF THE INVENTION

Known wiper blade supports, made of a metal or a suitable plastic material, generally comprise at least five elements, as:

an elastically deformable metal lamina, to which a longitudinal projection of the rubber blade is anchored;

two small bridges engaged near the opposed ends of the lamina;

a main rod which is articulated with its ends to the center of the two small bridges;

a connecting member, articulated on the center of the main rod and having the object to allow the coupling of the wiper blade with the end of the corresponding oscillable arm.

The number of elements forming the support, the accurate assembling of same and the efficiency of the articulated mutual engagements, determine the fairly high cost of each wiper blade.

Further, in order to minimize the noise of the wiper blades, when moving, and to improve the articulations of the members forming the hitherto known supports, many manufacturers use bearings made of plastic material inserted between the various articulations. These means further increase the cost of the wiper blades and their results are poor.

Finally, the structure of the known supports for the wiper blades is very cumbersome and the results are troublesome, both practically and aesthetically.

SUMMARY OF THE INVENTION

In order to overcome the previously listed drawbacks, the present invention has, as its subject matter, a support for wiper blades characterized in that it is preferably formed by a single elastic lamina carrying the wiper blade and directly provided with connecting means for its connection to the end of the oscillable arm, or to the known intermediate member through which the connection with the oscillable arm is obtained in a disconnectable way.

According to an intuitive variant, the laminate structure of the support for a wiper blade may be formed by two or more superimposed laminae, as a leaf spring on the back of the rubber blade.

BRIEF DESCRIPTION OF THE DRAWINGS

More clear particular features of the invention will result from the specification referred to the accompanying drawings, given only as a demonstrative example, and wherein:

FIG. 1 is a perspective view of a complete wiper blade provided with the back support according to the invention;

FIG. 2, on a larger scale, is a partial perspective view of the same wiper blade;

FIG. 3 is a plan top view of the section represented on FIG. 2;

FIG. 4 is a cross section view, enlarged, taken along the line IV—IV of FIG. 2;

FIG. 5 is another cross section view taken along the line V—V of same FIG. 2;

FIG. 6 is a partial perspective view of the laminate support according to a first variant; and FIG. 7 illustrates a wiper blade section, in a side view and according to another variant.

DETAILED DESCRIPTION OF PREFERRED EMBODIMENTS

As previously indicated and as shown on FIGS. 1 to 5, the support 10 for a wiper blade 11 is formed by a single lamina of a metal or a suitable plastic material, which is elastically deformable in the longitudinal direction and arcuated according to a radius related to the curvature of the surface to be wiper.

Said lamina 10 is provided with a longitudinal slit 15 forming the retaining seat for the rib 11a which is mounted through the window 12. The pair of ears 13 provided with coaxial holes 13a or, directly, with a connecting member not shown, allow the disconnectable assembling of the wiper blade with respect to the end of the corresponding oscillable arm.

The laminate support 10 of a suitable thickness may be provided with windows 14, to make it lighter (FIG. 6), and capable of differentiating the longitudinal flexibility of the support, increasing it near the opposed ends. Windows 14 may be each of a different size and distributed in any manner along the lamina 10 and with respect to the longitudinal slit 15.

As represented on FIG. 7, superimposed laminae 10a, 10b may co-operate with lamina 10 and form a leaf spring.

In this case, while the lamina or the additional laminae 10a, 10b are suitably locked between the ears 13 at any point of their length or at their ends they are provided with brackets 10c (FIG. 7-A) which keep together their parallel branches and allow the passage of the rib 11a through the longitudinal slit 15.

Finally, the single support lamina 10 may be made with a differential thickness 10d as represented by dashed lines on FIG. 6, in order to make the center of the support stiffer and more flexible at its ends.

This expedient gives advantageous results, particularly when the single support lamina is made from a suitable molded plastic material.

In any case, the support according to the invention, either formed by a single laminate element, or by two or more superimposed laminate elements forming a leaf spring, or made of steel or a suitable molded plastic material, results in an efficient and economically convenient support of reduced encumbrance and therefore preferable to the present supports for both practical and aesthetic reasons.

A further and not negligible advantage deriving from the use of the support according to the invention resides in that, due to its great longitudinal flexibility, with respect to the known supports, it allows a considerable reduction of the load acting on each wiper blade, through the known spring carried by the corresponding oscillable arm. The reduction of the operating load lengthens the useful life of the wiper blade and hence the efficiency of the device.

Obviously, the invention is not limited to the examples which have been described and illustrated but it comprises any further variant of its subject matter as well as the possible improvements which may be suggested by practical application requirements.

I claim:

1. A support for wiper blades in windshield wiper installations on motor vehicles, comprising:

a molded plastic element curved as a leaf spring and elastically deformable in the longitudinal direction and having a thickness which decreases from the center towards the ends thereof, said element being provided with a longitudinal slit therein suitable for retaining a longitudinal rib of a wiper blade, a window at one end of said slit for inserting the rib of the wiper blade into the slit, said slit having a plurality of widened areas similar to said window symmetrically formed in the zones of the element near the ends thereof to increase the flexibility, in the longitudinal direction, of said zone; and a second element, curved as a leaf spring and elastically deformable in the longitudinal direction, and being superposed on said molded plastic element and assembled as a leaf spring, said second element having a length shorter than said molded plastic element and being formed by a pair of parallel branches mutually connected by brackets which are formed as small bridges.

* * * * *